(12) United States Patent
Hosein

(10) Patent No.: US 6,567,515 B1
(45) Date of Patent: May 20, 2003

(54) DYNAMIC CONTROL OF MULTIPLE HETEROGENEOUS TRAFFIC SOURCES USING A CLOSED-LOOP FEEDBACK ALGORITHM

(75) Inventor: Patrick Ahamad Hosein, Holmdel, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/294,828

(22) Filed: Apr. 19, 1999

Related U.S. Application Data

(60) Provisional application No. 60/113,321, filed on Dec. 22, 1998.

(51) Int. Cl.⁷ .................................................. H04M 7/00
(52) U.S. Cl. ............. 379/230; 379/112.01; 379/112.05; 379/112.06; 379/112.11; 379/133; 379/221.08; 379/221.09
(58) Field of Search ..................... 379/112.01, 112.04, 379/112.05, 112.06, 133, 134, 221.08, 221.09, 221.12, 230

(56) References Cited

U.S. PATENT DOCUMENTS

| | | | | | |
|---|---|---|---|---|---|
| 4,788,718 | A | * | 11/1988 | McNabb et al. | 379/112.08 |
| 5,581,610 | A | * | 12/1996 | Hooshiari | 379/133 |
| 5,825,860 | A | * | 10/1998 | Moharram | 379/112.01 |
| 6,084,955 | A | * | 7/2000 | Key et al. | 379/220.01 |
| 6,115,462 | A | * | 9/2000 | Servi et al. | 379/221.06 |

OTHER PUBLICATIONS

Farel and Gawande, Design and Analysis of Overload Control Strategies for Transaction Network Databases, Teletraffic and Datatraffic in a Period of Change, pp. 115–120, 1991.

* cited by examiner

Primary Examiner—Harry S. Hong
Assistant Examiner—Bing Bui

(57) ABSTRACT

Described is a method for controlling nodes in a network including the steps of sending a proposed maximum working rate to a plurality of nodes, computing the number of responses received from the nodes by a central controller in a set period and adjusting the maximum working rate sent to the nodes based on the number of responses received.

9 Claims, 2 Drawing Sheets

DYNAMIC CONTROL OF MULTIPLE HETEROGENEOUS TRAFFIC SOURCES USING A CLOSED-LOOP FEEDBACK ALGORITHM

REFERENCE TO PROVISIONAL APPLICATION

A claim for priority is made to U.S. Provisional Application Ser. No. 60/113,321 filed on Dec. 22, 1998.

BACKGROUND

The invention relates generally to traffic regulation in a communications network. More particularly, the invention relates to dynamically controlling the flow of traffic regulation using a feedback mechanism.

Modern telecommunications networks often consist of a plurality of nodes that receive data operations (queries) at varying incoming rates and forward these operations to a central controller (database). Because the total rate that all nodes combined can generate may exceed the capacity of the central controller, at times the central controller may become overloaded. In order to avoid the problems that would result from a central controller's overloading, it may be necessary for the central controller to direct one or more of the nodes to forward operations at a rate that is less than the present incoming rates of these nodes.

In order for an algorithm to direct the nodes to perform at an optimal operating rate, it is necessary to take into account the dynamic features of modern telecommunications networks. First, nodes are added to and/or removed from modern telecommunications networks in real time as the network is operating. Second, each node may operate at a different rate than any other node. Accordingly, it would not be efficient for an algorithm that computes the rate of optimal node performance to be based on the number of nodes in the network or the actual operating rate of any single node.

In the prior art, a previous algorithm designed to determine the optimal operating rate of the nodes would first choose a constant rate, $\epsilon$, and a multiple of the constant rate, $x\epsilon$. The values $\epsilon$ and $x$ would be determined based on the overall characteristics of the telecommunications network. The algorithm would then direct each node in the telecommunications network to operate at a maximum rate of $x\epsilon$ for a predetermined period of time. After this predetermined period of time, if the aggregate output generated by the nodes and received by the central controller was too large, the algorithm would direct the nodes to operate at a maximum rate of $(x-1)\epsilon$ for the next predetermined period of time. If the output generated by the nodes and received by the central controller was too small, the algorithm would direct the nodes to operate at a rate of $(x+1)\epsilon$ for the next predetermined period of time. The algorithm would continue this operation periodically until the algorithm converged on the optimal multiple of the constant rate $\epsilon$.

This algorithm's main drawback is that its success is based primarily on whether the initial choice of $\epsilon$ is ultimately proper. If the chosen $\epsilon$ is too small, the algorithm takes too long to converge to the optimal operation rate. If the chosen $\epsilon$ is too large, the algorithm causes the operation rate of the nodes to oscillate about the optimal rate such that throughput in the network is adversely affected. Additionally, real-time changes in the number of nodes and the number of operations processed by each node, which often occurs in modern telecommunications networks, impede the efficient operation of this algorithm.

Accordingly, there is a need in the art for a method that dynamically determines the operating rate for nodes in a telecommunications network such that a central controller may process the output of the nodes in an optimal fashion.

SUMMARY

Embodiments of the present invention provide a method for controlling nodes in a network including the steps of sending a proposed maximum working rate to the nodes, computing the number of responses received in a set period and adjusting the maximum working rate based on the number of responses received.

DETAILED DESCRIPTION

Table 1 illustrates the variables that are used to demonstrate the operation of embodiments of the present invention, including the units, if any, of each variable:

TABLE 1

| Variable | Representation | Units |
| --- | --- | --- |
| R | Maximum number of operations per second central controller can handle without overload | operations/s |
| N | Number of nodes in the network | |
| $r_{ideal}$ | Ideal uniform rate for each node to operate | operations/s |
| T | Periodic time length | s |
| i | Iteration, where i is a whole number | |
| r(iT) | Proposed uniform maximum operation rate of nodes for time period (iT, (i + 1)T) | operations/s |
| N* | Number of nodes with an incoming rate that exceeds r(iT) over time period (iT,(i + 1)T) | |
| K | Total number of operations processed by nodes with incoming rates less than r(iT) over time period (iT,(i + 1)T) | operations |
| $N_{guess}$(iT) | Present guess as to R/$r_{ideal}$ | |
| M(iT) | Actual number of operations received by central controller over time period ((i − 1)T, iT) | operations |

The present invention is directed to a technique for periodically determining a uniform maximum operating rate for each node connected to a central controller in a network and determining the actual number of operations received by the central controller in a given time period. Based on this feedback information, the method of the present invention calculates a new uniform maximum operating rate for each node. This process is repeated and converges until the uniform maximum operating rate for each node produces the maximum number of operations per time period that the central controller can handle without overload.

Figure 1:
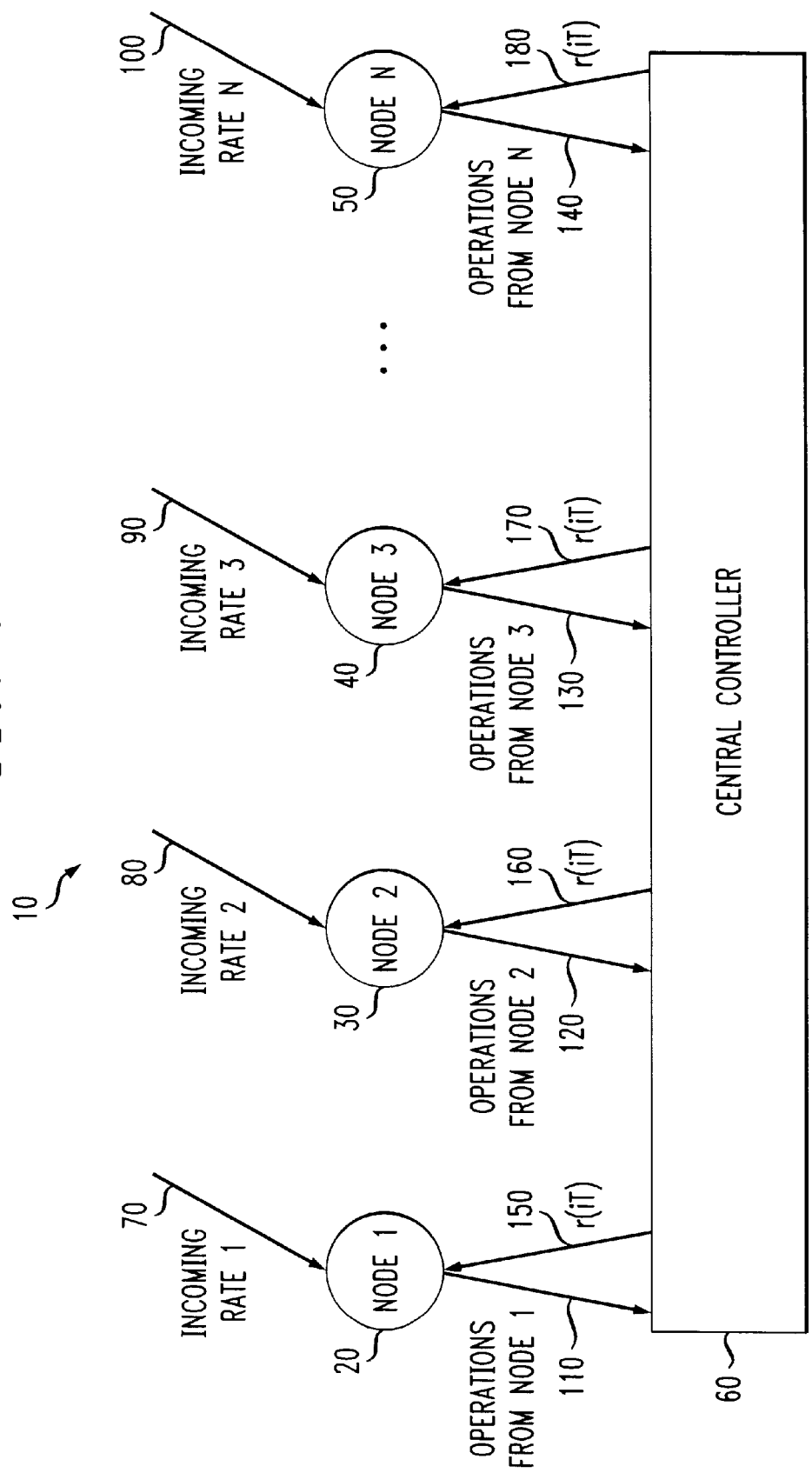
FIG. 1 depicts a partial illustration of a modern telecommunications network illustrating a physical embodiment in which the present invention may be performed.

A partial representation of a modern telecommunications network can be found at FIG. 1. The figure illustrates a network 10 containing a central controller 60 and a node 1 20, node 2 30, node 3 40 up to a node N 50, where N denotes the number of nodes currently in the network 10. Each node 20, 30, 40, 50 receives data at an incoming rate via connectors 70, 80, 90, 100. Each node 20, 30, 40, 50 also interfaces with the central controller 60 via connectors 110, 120, 130, 140. Connectors 110, 120, 130, 140 transmit the operations for each node 20, 30, 40, 50 to the central controller 60. The central controller 60 has the ability to direct each of the nodes 20, 30, 40, 50 via connectors 150, 160, 170, 180 to process a maximum number of processes r(iT)T per time period (iT,(i+1)T).

Embodiments of the central controller may be any device that receives the operations of the nodes and that can direct the rate of processing of the nodes including, for example, a database at a Service Control Point (SCP) in a telecommunications network. Embodiments of the nodes may be any device that processes information for relaying to a central controller including, for example, a switch used in a telecommunications network.

The present invention is based on the principle that the ideal number of operations RT to be received by the central controller 60 during a time period (iT,(i+1)T) (where i is any whole number) is equivalent to the number of nodes N* that are controlled at rate $r_{ideal}$ multiplied by the period T plus the total number of operations K processed by those nodes that operate at a rate less than $r_{ideal}$. Thus:

$$RT = r_{ideal} N^* T + K \quad (1)$$

and, solving for $r_{ideal}$:

$$r_{ideal} = \frac{RT - K}{N * T} \quad (2)$$

For purposes of the present invention, R is a known quantity that is a function of the capacity of the central controller 60. Based on the known R and the number of operations M(iT) received during time period ((i−1)T,iT), the algorithm seeks to quickly find a $r_{ideal}$. Although parameters R, N, and N* also may change over time, the changes in these parameters are relatively small over a time period (iT,(i+1)T). Accordingly, the present invention also automatically adjusts to find the new $r_{ideal}$ as quickly as possible after these parameters change.

Figure 2:
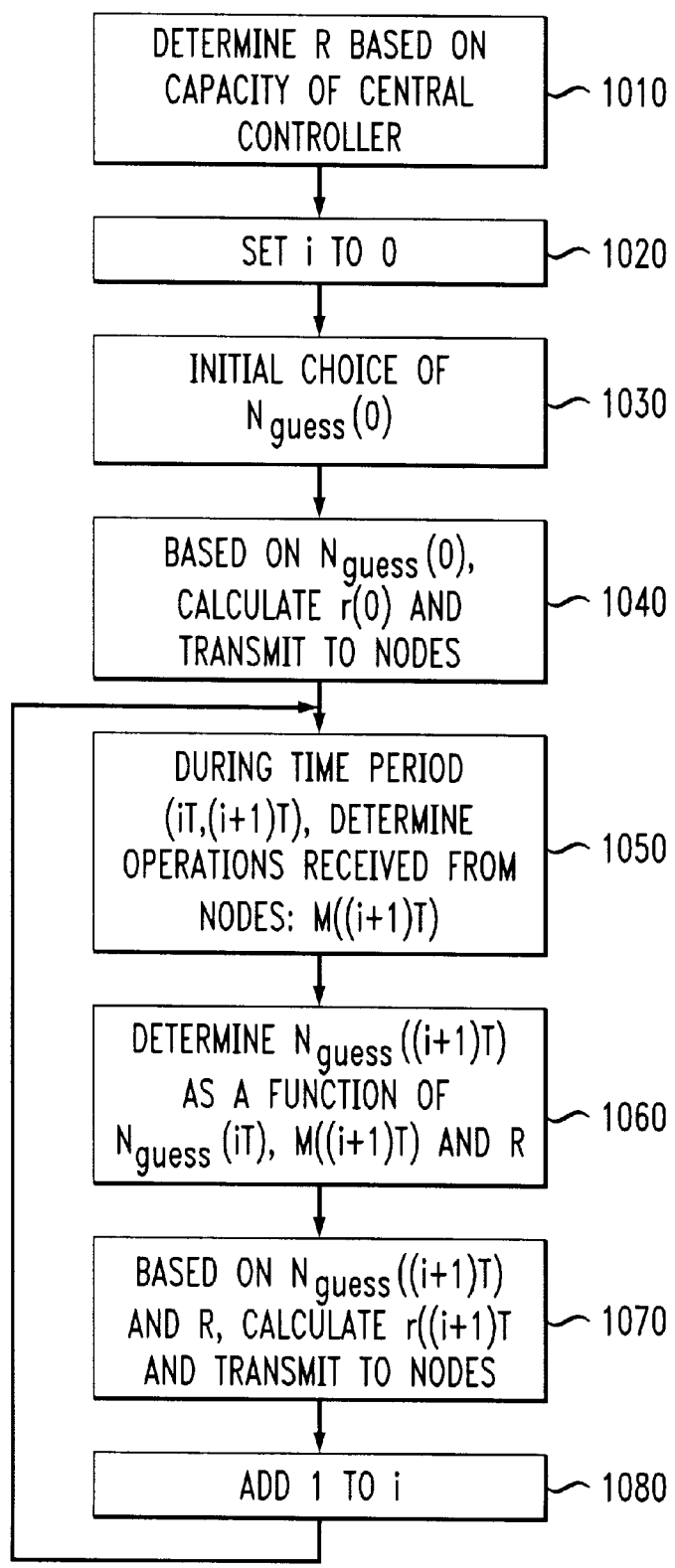
FIG. 2 depicts a flowchart illustrating an embodiment of the present invention.

As illustrated in FIG. 2, an algorithm embodying the present invention begins with the calculation of the ideal number of operations R to be received by the central controller 60. (Step 1010). R is calculated by a method not shown, and is assumed to be a given value in the present invention. The iteration counter i of the algorithm is initially set to 0 (Step 1020) and an initial guess $N_{guess}(0)$ is chosen based on global network parameters using a method not shown. (Step 1030). With R known, the maximum rate r(0) for each node 20, 30, 40, 50 to operate during time period (0,1T) can be calculated based on Equation 3:

$$r(0) = \frac{R}{N_{guess}(0)} \quad (3)$$

Thus, the algorithm instructs the nodes 20, 30, 40, 50 to operate at a maximum of r(0) operations per second for the time period (0,1T). (Step 1040). During this time period, the algorithm keeps a tally of the number of operations M(1T) actually received by the central controller 60 from the nodes 20, 30, 40, 50 via connectors 110, 120, 130, 140. (Step 1050).

The number of operations received by the central controller 60 from the nodes 20, 30, 40, 50 during time period (0,1T) can be expressed as the maximum rate r(0) that each node operated during time period (0,1T) multiplied by the number of nodes N* that operated at rate r(0) multiplied by the period T plus the total number of operations K processed by those nodes that operated at a rate less than r(0) during time period (0,1T). In other words, K represents the total number of operations processed during time period (0,1T) by those nodes 20, 30, 40, 50 whose incoming rates 70, 80, 90, 100 were less than the r(0) transmitted to them by the central controller 60 via connectors 150, 160, 170, 180. Equation 4 reflects this relationship:

$$M(1T) = N^* r(0) T + K \quad (4)$$

Because r(0) is known from Equation 3, Equation 4 can be rewritten:

$$M(1T) = \frac{RN * T}{N_{guess}(0)} + K \quad (5)$$

The algorithm next calculates the value of $N_{guess}(1T)$ for the time period (1T,2T), which is computed as $N_{guess}(0)$ multiplied by the amount of the number of operations M(1T) received during the previous time period (0,1T) divided by the known total capacity R of the central controller 60:

$$N_{guess}(1T) = \frac{N_{guess}(0) M(1T)}{RT} \quad (6)$$

(Step 1060). Because $N_{guess}(1T)$ is in part a function of M(1T) (which is the amount of operations actually received into the central controller 60 during time period (0,1T)), the total number of operations K processed by those nodes that operate at a rate less than $r_{ideal}$ during time period (0,1T) is taken into account when determining $N_{guess}(1T)$.

Based on Equation 3, the new value of r(1T) for period (1T,2T) can be calculated from the $N_{guess}(1T)$:

$$r(1T) = \frac{R}{N_{guess}(1T)} \quad (7)$$

(Step 1070). Thus, the central controller 60 instructs the nodes 20, 30, 40, 50 via connectors 150, 160, 170, 180 to operate at a maximum rate of r(1T) operations per second for the time period (1T,2T). During this time period, the central controller 60 will keep a tally of the number of operations M(2T) received from the nodes 20, 30, 40, 50 via connectors 110, 120, 130, 140. (Steps 1080, 1050). As previously shown, from this value of M(2T), a new $N_{guess}(2T)$ and r(2T) are calculated for time period (2T,3T).

This algorithm is repeated periodically with a new $N_{guess}$(iT) and r(iT) being calculated based on the value of $N_{guess}$((i−1)T) and M(iT) for each iteration i:

$$N_{guess}(iT)) = \frac{N_{guess}((i-1)T) M(iT)}{R} \quad (8)$$

$$r(iT) = \frac{R}{N_{guess}(iT)} \quad (9)$$

Ultimately, the values of $N_{guess}$(iT) and r(iT) converge such that:

$$\lim_{i \to \infty} N_{guess}(iT) = N_{guess}((i-1)T) \quad (10)$$

$$\lim_{i \to \infty} r(iT) = r((i-1)T) = r_{ideal} \quad (11)$$

Based on equation 8, when $N_{guess}$(iT) is equal to $N_{guess}$((i−1)T), M(iT) will equal RT. This situation is optimal because the number of operations actually received by the central controller M(iT) over a given time period ((i−1)T,iT) is equal to the number of operations RT capable of being handled by the central controller during the same time period.

In another embodiment of the present invention, the value $N_{guess}(iT)$ is calculated as a function of more than one of the previous values of $N_{guess}(iT-xT)$, where x<i. For example, the value of $N_{guess}(iT)$ could be determined as a function of $N_{guess}(iT-1T)$, $N_{guess}(iT-2T)$ and $N_{guess}(iT-3T)$. This will produce a smoother transition between the changes in r(iT) over time, allowing the network 10 to more easily adjust to the changing values of r(iT).

As the algorithm proceeds, several global parameters of the network 10 may be altered due to external factors. First, a number of nodes may be added or deleted from the network, which will alter the parameter N. Second, the maximum number of operations per second the central controller can handle without overload may change, which will alter the parameter R. Third, the number of nodes with an incoming rate that exceeds r(iT) may change, which will change N*. Alteration of any one these parameters may change the $r_{ideal}$ for the network 10. Because of the use of the dynamic feedback mechanism as reflected in Equations 8 and 9, the algorithm will begin converging to the new $r_{ideal}$ starting with the next iteration iT. This convergence will generally be effective because the potential changes in N, R, or N* are usually small when measured over a single time period (iT,(i+1)T). Thus, the algorithm will successfully adjust to the changes in these global network parameters.

Accordingly, the present invention incorporates a feedback mechanism that allows a network 10 to produce a relatively rapid convergence to the ideal maximum rate for each node 20, 30, 40, 50 to operate such that the central controller 60 receives an optimal number of operations. It will be appreciated by those skilled in the art that the specific embodiments disclosed above may be readily utilized as a basis for modifying or designing other methods and techniques for carrying out the same purposes of the present invention. It should also be realized by those skilled in the art that such equivalent constructions do not depart from the spirit and scope of the invention as set forth in the following claims.

What is claimed is:

1. A method for controlling nodes in a network, comprising:

determining the capacity of a central controller during a specific time period;

setting an iterative variable to zero;

guessing an initial value of the ratio of the capacity of a central controller during the specific time period to a proposed uniform maximum operation rate of a plurality of nodes for the specific time period;

transmitting the proposed uniform maximum operation rate of a plurality of nodes for the specific time period to the plurality of nodes; and determining the operations received by the plurality of nodes during the specific time period.

2. The method as in claim 1, further comprising:

calculating a new proposed uniform maximum operation rate of a plurality of nodes for a new specific time period based on the operations received by the plurality of nodes during the specific time period.

3. The method as in claim 2, further comprising:

incrementing the iterative variable.

4. The method of claim 3, further comprising:

converging on an ideal maximum uniform working rate.

5. The method of claim 2, wherein the new proposed uniform maximum operation rate of a plurality of nodes for a new specific time period is based on the operations received by the plurality of nodes during a plurality of previous specific time periods.

6. The method of claim 1, wherein the central controller is a database at a service control point.

7. The method of claim 1, wherein the plurality of nodes are switches used in a telecommunications network.

8. A method of controlling nodes in a communications network, comprising:

determining an initial operation rate for a plurality of nodes in a communication network during an initial time period based on the capacity of a central controller where the initial operation rate is defined by the equation, $r(0)=R/N_{guess}(0)$, where R is the operation capacity of the central controller and $N_{guess}$ is the initial guess of the ratio of the operation capacity of the central controller to the initial operation rate;

transmitting the initial operation rate to the plurality of nodes;

determining the number of operations received by the plurality of nodes during the initial time period;

determining a new operation rate for the plurality of nodes for a subsequent time period based on the number of operations received by the plurality of nodes during the initial time period where the new operation rate is defined by the equation, $r(1T)=R/N_{guess}(1T)$, where R is the operation capacity of the central controller and $N_{guess}$ is the guess for the ratio of the operation capacity of the central controller to the initial operation rate; and transmitting the new operation rate to the plurality of nodes.

9. The method of claim 8, further comprising:

determining and converging to an optimal operation rate for the plurality of nodes based on successive determining of a new operation rate based on the number of operations received by the plurality of nodes during a previous time period where the optimal operation rate is defined by the equation, $$\lim r(iT)=r((i-1)T)=r_{optimum} \text{ as } i\to\infty,$$

where $r(iT)=R/N_{guess}(iT)$.

* * * * *